May 7, 1968  H. M. MUNCHERYAN  3,382,343
LASER WELDING MACHINE
Filed July 23, 1964  3 Sheets-Sheet 1
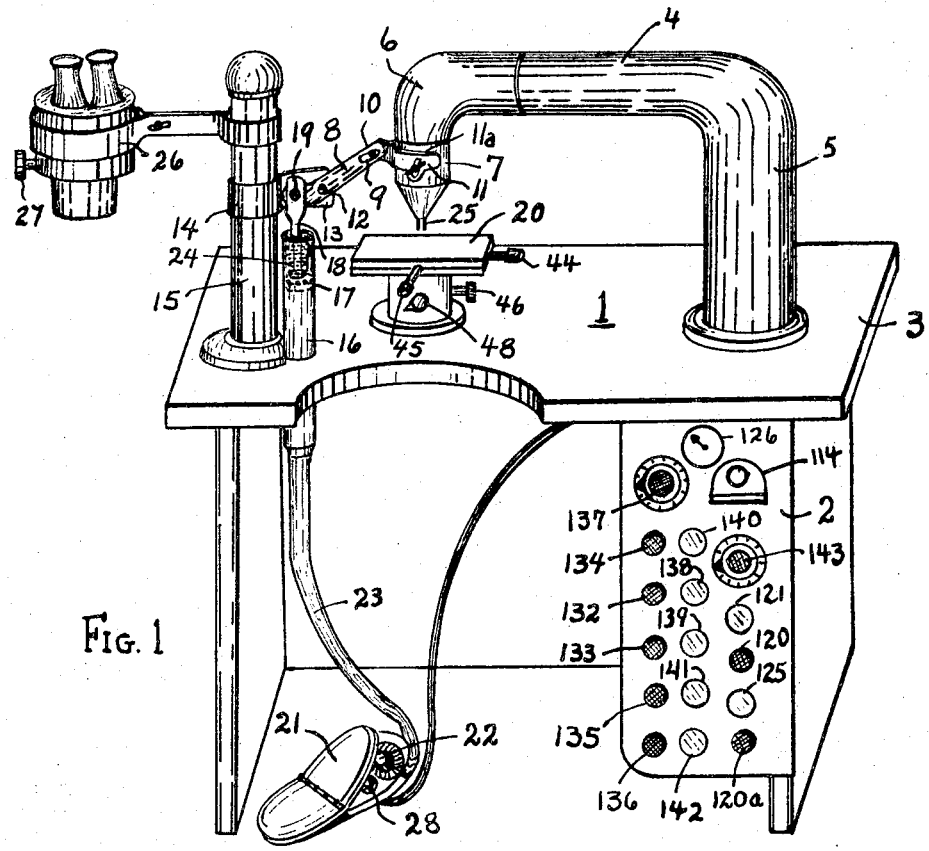
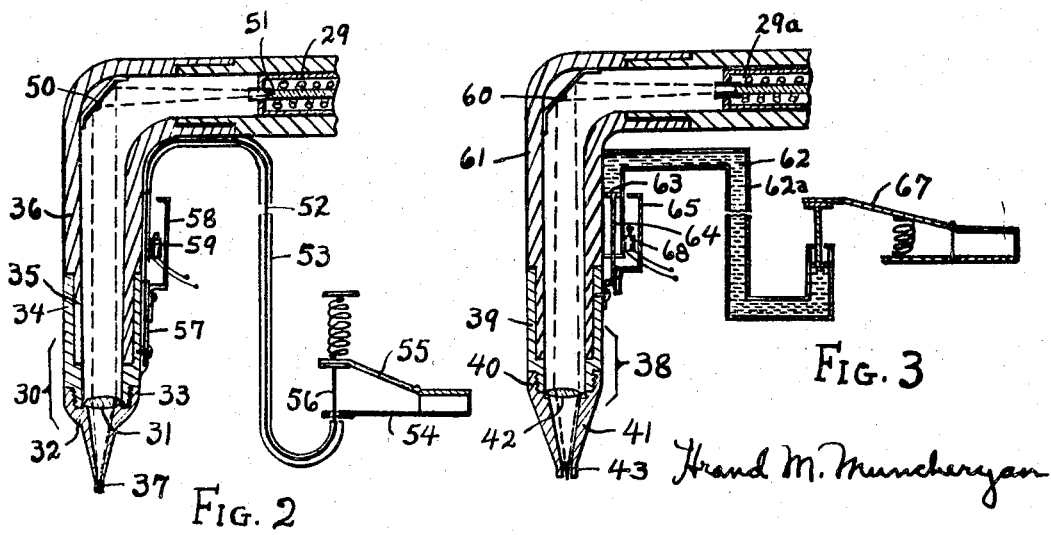
Hrand M. Muncheryan

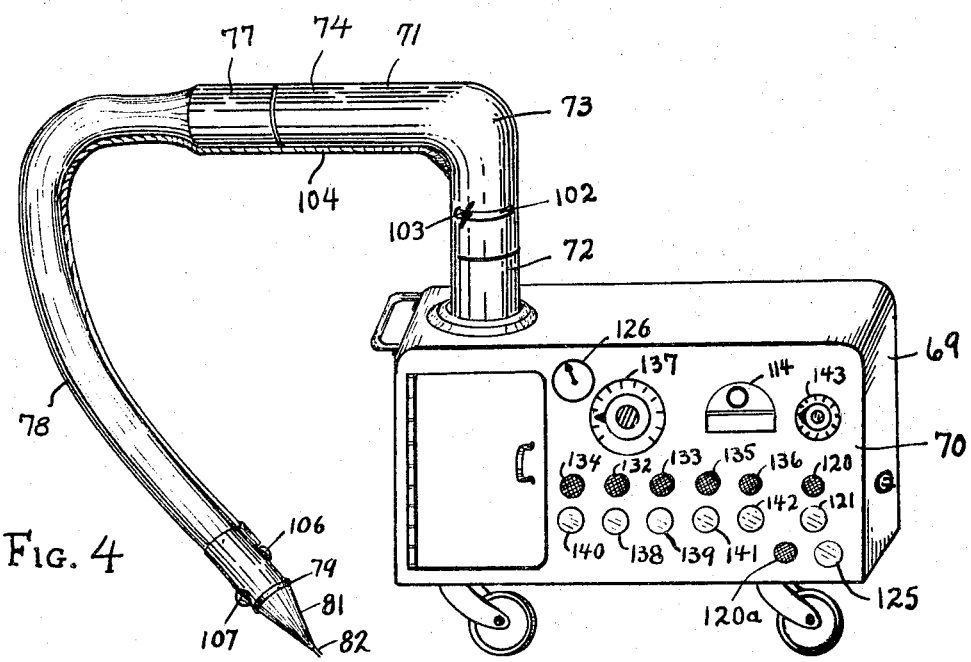
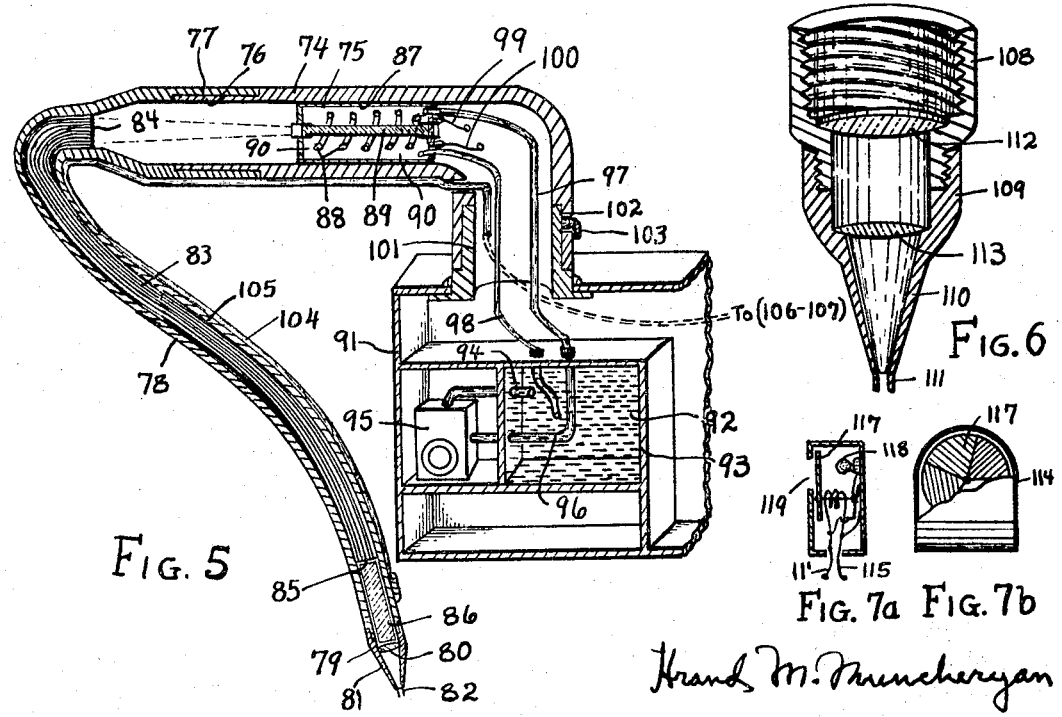

3,382,343
LASER WELDING MACHINE
Hrand M. Muncheryan, 1735 Morningside St., Orange, Calif. 92667
Filed July 23, 1964, Ser. No. 384,655
14 Claims. (Cl. 219—121)

ABSTRACT OF THE DISCLOSURE

A laser welding machine is described, covering a console or work bench having a water-cooled laser welding head supported thereon and adapted to be rotated horizontally or vertically to position said head with respect to a workpiece. A pulse-repetition-controlled power supply contained in said console furnishes power to activate the laser head, which is provided with a short optical system for welding parts positioned on said console and being interchangeable with an elongated optical system consisting of a light pipe, a laser amplifier, and a lens means for welding structures remote from said console. Each of the optical systems terminates in a conical lens mount having a split tip spaced from the lens in said mount a distance equal to the focal length of said lens to focus the laser beam on the workpiece upon contact of said split tip therewith.

---

The present invention relates to welding machines and more particularly to a high-power laser welding machine which is capable of utilizing the energy from a laser beam generator to weld microminiaturized electronic components as well as structural parts such as aircraft fuselage skin, wing coverings, rocket or missile structures, and the like, from either outside or inside the aircraft.

This invention is an improved embodiment of the laser welding machine described and claimed in an application filed by me in the United States Patent Office on May 5, 1964, Ser. No. 364,923, in which I have disclosed a laser welding machine which operates both manually and automatically, as desired; it is provided with a power supply located adjacent to the work area on the flat top of the welder console and, in one species, the electrical connection cables and cooling conduits are exposed as they are led from the laser generating head to the power supply, thus offering the convenience of rapid changeover from one laser generating head to another. In a principal species, the welding head moves to and from the workpiece automatically by means of a variable-speed motor; this operation then is compatible to seam welding as well as to discrete welds.

In the present embodiment, the power supply is placed in a compartment under the laser welding area so as to permit accommodation of large workpieces and flexibility of diversified laser welding operations. The power supply circuit has been modified to produce larger power as necessary for welding thicker and heavier workpieces. An automatic timer has been included so that the interval of laser pulses can be regulated automatically as well as manually. In one species, the equipment is provided with a swivel laser-head configuration to permit the rotation of the laser welding head horizontally as well as vertically for unrestricted freedom of movement in any direction desired. The temperature of the laser generating head is kept uniformly constant by the provision of a self-contained closed-circuit system, and is monitored by means of a variable-color temperature indicator by change of color corresponding to a specific temperature.

A principal advantage of the invention is the provision of a laser welding console embodying a laser generating head and permitting a large area for accommodation of a workpiece by the placement of the power supply remotely from the laser work area.

A further object of the invention is to provide flexibility of movement of the laser welding head to and from the workpiece by the provision of a swivel laser generating head mechanism.

A still further object of the invention is the provision of a light pipe to transmit the laser beam to areas located remotely from the laser generating head and to control the laser pulse with a trigger switch located on the welding head by means of a series-connected double-switch mechanism for safety purposes.

Another object of the invention is to provide a means at the welding head that permits the welding head to be placed on the area to be welded without the use of a microscope to locate the laser beam focus onto the workpiece, since when the laser welding head touches the workpiece the distance therefrom to the optical lens is exactly equal to the focal length of the lens. Therefore, the beam is always in focus when the laser welding head is in contact with the workpiece.

A further object of the invention is to provide a refrigerated liquid to maintain the laser generating head at a predetermined temperature, and means to continuously monitor this temperature and to stop laser action when excessive temperature conditions exist therein.

A still further object of the invention is the provision of an automatic pulse interval timer to fire laser bursts at predetermined intervals in succession without releasing the trigger switch once it is depressed.

Other objects and advantages of the invention will be made manifest in the following specification taken in conjunction with the accompanying drawings, wherein like numerals designate corresponding parts throughout the several views of the invention, and wherein:

FIGURE 1 is a plan view of the laser welding machine.

FIGURE 2 is a sectional view of a modified arrangement of the laser optical system, the pedal mechanism manipulating the up and down movement of the optical system, and the trigger switch to start and stop the laser action.

FIGURE 3 is a sectional view of a hydraulically operated optical system showing the scheme of operation and the location of the trigger switch.

FIGURE 4 is a plan view of a modified embodiment of the laser welding machine mounted on wheels to permit easy positioning of the machine near the workpiece or the structural part to be welded in a remote location from the welding machine.

FIGURE 5 is a sectional view of the laser generating head, the optical system comprising a fiber optics bundle (light pipe) and the lens mechanism, and an illustrative view of the laser generating head cooler.

FIGURE 6 is a sectional view of the lens mount adapted to be interchanged with other lens mounts provided with corresponding lenses of specific focal lengths.

Figure 8:
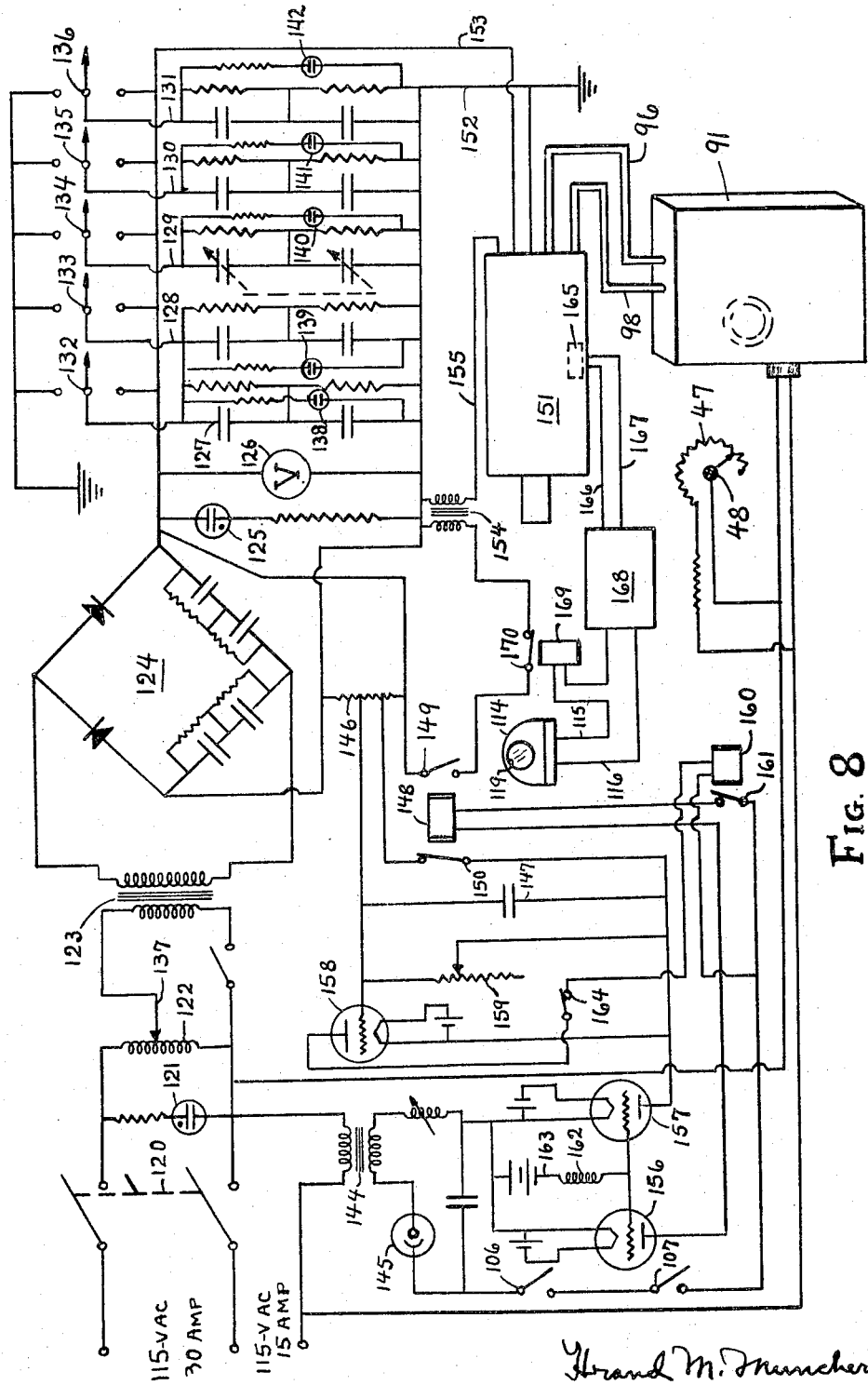

FIGURE 7(a) is a plan view of the laser head temperature indicator partially sectioned to show the variable-color indicator disk, and (b) is a side view sectioned to illustrate the manner of arrangement of the inner structures, and FIGURE 8 is a schematic circuit diagram of the power supply, showing the temperature monitoring systems, the pulse interval timer, and the manner of connection of the laser generating head to the power supply and to the cooling system.

With reference to the drawing, the numeral 1 is a laser console embodying a laser power supply 2 mounted on one side in an area between the legs of the console and beneath the flat top 3, on which is a laser generating cylindrical head 4 supported by a cylindrical L-column 5 containing the power supply cables and cooling ducts communicating with the laser generating head. Located forward to the laser generating head 4 is a laser optical cylinder 6 housing the optical system comprising the lens mount 7 slidably mounted on cylinder 6 and movable thereupon down and up by means of the foot-operated lever 8. The lever 8 is provided at one end with an arcuate aperture 9 which accommodates a pin 10, freely movable therein and fixed on adjustable brace 11 firmly attached to the lens mount 7 by means of thumbscrew 11a. The opposite end of lever 8 is attached to and fulcrumed by a pin 12 fixedly positioned on an extension 13 from the collar 14 fastened to a post 15 mounted on the console flat top 3.

Attached to the flat top 3 and laterally to the post 15 is a cylindrical housing 16 containing a piston 17 (shown by broken lines) actuated by hydraulic fluid contained in the chamber below the piston 17. The upper side of the piston 17 is connected through a plunger 18 by means of a freely disposed pin 19 to the terminal end of lever 8, so that when the piston 17 moves the plunger 18 upward the opposite end of lever 8 moves downwards, thereby moving the lens mount 7 toward the workpiece positioned on platen 20 during welding. This operation is accomplished by stepping on the spring-loaded foot pedal 21, which contacts a plunger 22 and compresses the fluid contained in flexible conduit 23 and thereby pushes the piston 17 upward in cylinder 16. When the pedal 21 is released, it retracts by spring action underneath the pedal (not shown in FIGURE 1), and the hydraulic fluid returns by the downward action of spring 24 (broken lines) exerting against the top of piston 17. This motion of the piston 17 causes the lever 8 and thereby the lens mount 7 to move upward. Thus, during welding, depressing the pedal 21 will bring the lens mount 7 to the workpiece, which can be held under desired hydraulic pressure by means of the split tip section 25 of the lens mount 7.

During welding operation, the workpiece is positioned under the lens mount 7 in such a manner that the miniature area to be welded is aligned exactly between the two ends of the split tip 25. The function of the split tip arrangement of the lens mount 7 is dual: to allow escaping of any gaseous or vaporized particles of dust or dirt that may form from the workpiece, and to provide good physical contact between the faying surfaces of the workpiece being welded by pressing thereupon. The alignment of weld area with respect to the split tip 25 and thereby to the laser beam may be performed by means of a binocular microscope 26, which by magnifying the area to be welded facilitates positioning of the workpiece. To achieve this, the microscope can be swung forward so that it is between the operator and the laser generating head 6. The microscope is then focused on the workpiece by means of the adjustment knob 27. The laser capacitance bank switch 120a (described with the circuit diagram in FIGURE 8) is turned on, and the pedal 21 is gradually pressed down by foot to bring the lens mount 7 gradually onto the weld area and the workpiece is then aligned by means of the micrometer adjustments 45 and 46 (to be described presently) of platen 20. When the weld area is properly aligned between the projections of split tip 25, the pedal 21 is pressed as far down as it will go. This action causes a contact between the pedal 21 and a microswitch 28 thereunder connected through a cable 28a to the laser triggering circuit. This action triggers the laser generator, such as 29 or 29a shown respectively in FIGURES 2 and 3, to an emission of laser pulse. The pedal is released and the workpiece is moved or advanced by the micrometer adjustments so that the next area to be welded is positioned in place. The operation is repeated until welding all parts of the workpiece is accomplished.

The focusing of the laser beam to a point on the weld area is accomplished by means of a converging (biconvex) lens positioned in the lens mount 7. The arrangement of the lens within the lens mount 7 is similar to that in lens mount 30 (FIGURE 2), which contains a lens 31 disposed with its optical plane perpendicular to the central ray of the laser beam. Immediately forward to the lens 31 is an optical cone 32 held, by screw attachment at 33, on a cylindrical sleeve 34 slidably disposed on the reduced section 35 of optical cylinder 36. The tip of the optical cone 32 is split to form the projections 37. The terminal portion of the split tip 37 is disposed from the optical plane of the lens 31 by a distance equal to the focal length of the lens 31, so that when the split tip is placed upon the workpiece the focus of the laser beam is exactly on the area or spot to be welded. This arrangement eliminates measurement of the lens-to-workpiece distance every time a new workpiece is to be welded, because the beam will be always on focus when the split tip is in contact with the workpiece weld area.

The optical system shown in FIGURE 3 is identical with that of FIGURE 2 and that of FIGURE 1, the only difference being in the mechanism for moving the lens mount to and from the workpiece. For instance, the lens mount 38 includes a cylindrical sleeve 39 threadly attached at 40 to the optical cone 41, and a biconvex lens 42 similarly mounted as lens 31. Since the converging lens 31 or lens 42 becomes perforated or damaged slightly by the laser beam after 15,000 to 20,000 laser bursts, the lenses are attached to the lens mount by means of temporary cement, such as rubber cement or the like. Numeral 43 designates the split tip of the optical cone 41. When it is desired to change the focal length of a laser-beam focusing lens, the optical cone together with the lens is removed and replaced by another lens and optical cone combination, the cone having an axial optical length from the lens equal to the focal length of the lens. The optical cones with their respective mounted lenses shown in FIGURES 1, 2, and 3, therefore, are interchangeable. The reason for change of focal length is that with a longer focal-length lens the focused laser beam is relatively sharper and narrower in projection, and thereby can penetrate thicker materials; whereas, with a shorter focal-length lens relatively wider and shallower spot welds can be achieved with the laser beam.

In FIGURE 1, directly below the optical system and adjacent to the split tip 25 of the lens mount 7 is the wokrpiece-supporting platen 20, which is provided with azimuth micrometer adjustments 44 and 45 to provide the platen with a two-dimensional movement. A third adjustment 46 enables the paten 20 to be displaced in a vertical direction; thus a three-dimensional displacement of the platen 20, and thereby the workpiece, can be accomplished. The sectional views showing the details of the micrometric adjustment mechanism are not given because of the universal concept of the device. However, a heater element 47, shown in the schematic diagram of FIGURE 8, having a control knob 48 to change the electrical resistance of the heater element 47, and thereby its temperature, has been incorporated in the housing 49 supporting the platen 20. By this latter means, the workpiece can be heated to compensate for incident laser-beam heat losses from high theremal conductivity materials, such as copper, gold, silver, aluminum, and the like. The temperature of the present heater can be controlled from 70° to 300° F., or higher, when necessary, by using a heavier-current heating element.

The horizontal laser beam from the laser generator 29 (FIGURE 2), is reflected at 90-degree angle by means of a mirror 50 disposed in the bend of the optical cylinder 36. Since the laser beam diverges about 1.5 milliradians as it leaves the laser generator port 51, the broken lines illustrate the manner of beam propagation to the lens 31 after having reflected from mirror 50. The lens mount 30 is actuated down and up by means of a steel cable 52 disposed in a flexible metal conduit 53, one end of which is attached to cylindrical sleeve 34 through a semicylindrical ferrule 57 welded thereunto. The other end 56 is attached to the supporting base 54 of the spring-loaded pedal 55. A contact lever 58 is also fastened to the cylindrical sleeve 34 of the lens mount 30; the free end of lever is bent 90 degrees toward the cylinder 36, so that it makes a contact with the lever of a microswitch 59, located on cylinder 36, to trigger the laser beam when the pedal 55 is depressed for laser welding.

Similar to species shown in FIGURE 2, the embodiment of FIGURE 3 is provided with a 45-degree mirror 60 positioned in the optical cylinder 61 to reflect the laser beam from the generator 29a onto the lens 42. The lens mount 38 is actuated by means of hydraulic fluid 62 in the flexible conduit 62a; the fluid 62 actuates a piston 63 with its plunger 64 attached to sleeve 39 of lens mount 38. The sleeve 39 is provided with a contact lever 65 adjustably fixed thereon with a thumbscrew adjustment 66. The upper free end of lever 65 is bent 90 degrees toward cylinder 61 so that during welding when the pedal 67 is depressed, the liquid therein presses the piston 63, which action causes the lever 65 to move downward and make a contact with a laser triggering microswitch 68 fixedly located on the flexible conduit 62a, which is rigidly fastened to the optical cylinder 61.

The plan view of a modified embodiment of my invention is shown in FIGURE 4, wherein the laser power supply is incorporated in a portable cabinet 69 having an instrument panel 70 located on one side of the cabinet. The laser generating head section 71 is located at one end and top of the cabinet. This section 71 comprises a cylindrical supporting post 72 extending to a 90-degree bend section 73, forward to which is an elongated cylindrical extension 74 containing the laser generator 75 sectionally shown in FIGURE 5. The extension 74 terminates in a reduced cylindrical section 76 adapted to fixedly accommodate one end 77 of a fiber optics cable 78. The opposite end of the cable 78 is provided with a lens mount 79 having a lens 80 therein and an optical cone 81 terminating at a split tip 82. The fiber optics cable, or bundle, 83 is highly polished at the end surface 84 facing the laser generator 75. The other end 85 of the fiber optics bundle 83 is similarly polished to eliminated extraneous reflections from it.

In the embodiment shown in FIGURE 5, a laser emitting rod 86, such as ruby, neodymium-doped glass, neodymium-doped strontium tungstate, and the like, is disposed between the terminal end of the fiber optics and the lens 80 to intensify the laser beam transmitted through the fiber optics bundle 83; the laser rod 86 is used when the fiber optics bundle length is more than two feet, since attenuation due to absorption in the fiber optics of the laser beam becomes significant beyond this length. The presence of the laser rod 86 is also advantageous for intensifying the original laser beam, even with shorter fiber optics length, so that larger and heavier structural parts can be welded with the high-power laser beam thus produced. One to 50 joules of laser energy incident on weld area can be achieved with this equipment; this is particularly due to a self-contained closed circuit cooling system diagrammatically shown in FIGURE 5.

The laser generating head 75 consists of a housing 87 containing a flashlamp 88 and a laser-emitting rod 89, which can be any one of the above-stated laser rod materials. During operation, the laser rod becomes heated by the flashlamp 88 and by its own radiation energy generation, causing the laser rod 89 to lose efficiency of emission. Therefore, the laser rod is cooled to a constant temperature for a constant laser emission. This is accomplished by means of the cooling system 91 schematically illustrated in FIGURE 5. A liquid 92 of high specific heat, such as water or the like, is provided in the liquid reservoir 93. The liquid 92 is drawn through the inlet tube 94 into the water pump 95, cooled therein by refrigerative action (of a commercially produced refrigerating unit), and conducted out through tubing 96 and external conduit 97 into the chamber 90 of the laser generator. The liquid cools the flashlamp and the laser rod and returns through conduit 98 to the reservoir 93 somewhat warmed up. Thus, the liquid constantly circulates and cools the laser rod to a relatively constant temperature, such as room temperature, as may be chosen. Proper measures are taken so that no live wires are exposed to the liquid to eliminate an electric sparkover. The cathode and the anode of the flashlamp 88 are extended with their glass sleeves to the outside of the housing 87, as shown by portions of wires 99 and 100, corresponding to the respective leads 152 and 153 shown in FIGURE 8.

The supporting post 72 is provided with a peripherally reduced section 101 adapted to accommodate the lower end of section 73 rotatably thereof. A peripheral slot 102 is formed in section 73 and an adjustable thumbscrew 103 is disposed in the slot so that the laser generating head 71 can be rotated from 0 to 120 degrees in azimuth and can be adjustably fixed by means of the thumbscrew 103, when desired, at some azimuthal angle with respect to the long axis of the portable cabinet 69. An electric cable 104 is borne by the fiber optics sheath 105 to the terminal portion of the fiber optics cable 78, whereat it is connected to two series-connected laser triggering microswitches 106 and 107, also shown in FIGURE 8. The switch 107 corresponds to each of the microswitches 28, 59, and 68, shown respectively in FIGURES 1, 2, and 3.

In FIGURE 6 is a modified form of the lens mount, consisting of an upper cylinder 108 threadedly attached to a lower cylinder 109 embodying the optical cone section 110 terminating at split tip 111; this lens mount can be used in conjunction with the fiber optics bundle 78, wherein the screw threads of the cone 81 are not shown because of small size. Each of the cylinders 108 and 109 is provided with a lens. The upper cylinder 108 has a lens 112 and the lower cylinder 109 has a lens 113. The distance between the lenses can be varied by rotating the lower cylinder 109. The change of lens distance alters the emergent intensity of the laser beam; this is particularly important when attenuation of the emergent beam is required and, in which case, the lens 112 can be replaced by a biconcave lens. The laser then can be attenuated variably in combination with the lenses and change of distance therebetween.

A plan view of the temperature indicator 114 is shown in FIGURE 7(a) with lead-in wires 115 and 116. The operation of this indicator is the same as that of a voltmeter; that is, the indicator disk 117 rotates by the magnetic field created by the incoming signal current from the amplifier, the same as the pointer of a voltmeter. The disk 117 has three radially disposed temperature-indicating colors: blue for cold, green for normal, and red for high temperature. A light bulb 118 operating from the same circuit provides color visibility transmitted through the translucent disk 117 and indicated at aperture 119.

The laser power supply is schematically shown in FIGURE 8. It receivers 115-volt power from an external source of alternating current. When the main switch 120 and the capacitance bank switch 120a are closed, the indicator lamp 121 lights up and the potentiometer coil 122 is energized. This action impresses a voltage across a step-up transformer 123 which feeds the A.-C. power to a rectifying system 124, and lights up the indicator lamp 125 and energizes the kilovoltmeter 126, which indicates the kilovoltage across the bank of capacitors 127, 128, 129, 130, and 131. To obtain continuously variable capacitance values. the capacitor 127 retains 200 microfarads, 128 retains 300 microfarads. 129 is a continuously variable capacitor of 100 microfarads maximum, 130 retains 400 microfarads, and 131 retains 1000 microfarads, so that a capacitance value up to 1600 microfarads can be obtained from this bank. The number of capacitors shown in the drawing are only illustrative and do not necessarily correspond to the actual quantity in the circuit. Pushbutton switches 132 through 136 turn on and off the D.-C. current to the respective capacitors 127 through 131. The kilovoltage on the capacitors can be varied by the sliding control 137. Each of the capacitors is provided with an indicator lamp 138 through 142, respectively, so that each lamp is turned on as the corresponding capacitor is cut into the circuit.

To operate the laser welding machine, the main switch 120 is turned on, which action lights up the indicator lamp 121. Any one or more of the required capacitors 127 through 131 are cut in by depressing the respective pushbuttons. If capacitance regulation within 100 microfarads is to be made, the pushbutton switch 134 is depressed and the required capacitance from it is obtained by the control knob 143 which is provided with divisions on the panel from 1 to 100 microfarads. The capacitance bank switch 120a is turned on, which action energizes the kilovoltameter 126, the capacitors that were previously cut in, and the respective capacitor lamps light up. The voltage is set by the potentiometer control knob 137 to the required kilovolts in accordance with the expression joules (watt-seconds) $= V^2 C/2$. This energy in joules is applied to the flashlamp, such as 29; the higher this energy the more intense the flashlamp will glow, and the higher laser energy emission will be obtained. In the expression, V is given in kilovolts and C in microfarads. When the kilovoltmeter registers the required kilovolts, the machine is ready for welding operation.

When the main switch 120 is turned on, a second set of circuit is energized. This circuit consists of the transformer 144, the laser cooling system 91 thermostatically kept at a constant temperature, and the rectifying tube 145. Also, a small D.-C. current runs through resistor 146 and charges the capacitor 147. The safety switch 106 is then closed, and following this the laser trigger switch 107 is depressed, energizing the solenoid 148, which closes the switch 149 and opens switch 150. When switch 149 is closed, laser action takes place by a discharge of the previously charged capacitors through the xenon flashlamp 88 located in the laser generating head 151, the charges being conducted to the flashlamp through wires 152 and 153. The discharge across the flashlamp is initiated by the trigger voltage from transformer 154, which becomes energized upon closing of the switch 149. The lead wire 155 from the secondary side of the transformer 154 is led into the laser generating head 151 and is coiled a few times around the flashlamp to cause ionization of the gas therein by a static electric charge through the quartz wall of the flashlamp. Thus, the trigger static charge together with the capacitor simultaneous discharge activates the flashlamp to radiation of high-intensity light, which causes the laser rod to generate a beam of laser pulse.

The amplifier tubes 156, 157, and 158 are used for timing the interval between laser bursts, such as once every second, every two seconds, etc. This is accomplished as follows: At the same time that the relay (solenoid) 148 closes the switch 149, the switch 150 opens the circuit to the capacitor 147, previously charged by a small D.-C. voltage from resistor 146, with the consequence that the capacitor begins to discharge through the timer resistor 159 set to any required time interval. The value of the resistor is so chosen that the time elapsed to lower the capacitor 147 bias potential to the firing voltage of tube 158 determines the time interval. When the bias voltage is reached, the tube 158 fires, energizing the solenoid 160 which then opens the switch 161. This action causes the switches 149 and 150 to regain their normal positions, as indicated in the drawing. The capacitor 147 again begins to charge. The relay action always occurs at the peak of the A.-C. voltage waveform of a small A.-C. voltage from transformer 162 superimposed by a negative voltage from battery 163. Since tubes 157 and 158 are in series connection, they both start at the same point of the voltage waveform. This eliminates delay in relay closing or opening time. The switch 164 is opened manually when it is desired to trigger the laser at random intervals of time and for securing the equipment after use, in addition to switches 106, 120a, and 120, in that order.

Since it is not desirable to trigger the laser generator when the laser rod is abnormally heated, a temperature-monitoring system is provided with a transducer or thermistor 165 located inside the laser generating head 151. The heat generated within the laser head causes the thermistor 165 to develop a small voltage in proportion to the temperature. This voltage is fed through wires 166 and 167 to an amplifier 168, from which the amplified current is transmitted to the temperature indicator 114 in series with a relay 169, which opens the normally closed switch 170 when excessive temperature conditions exist in the laser generating head 151, thus preventing any further laser action to occur until normal temperature in the laser generating head is regained whereupon the switch 170 closes again.

Although preferred embodiments of my invention are shown and described, the invention is susceptible to further modifications in the detail of construction without departing from the spirit and scope thereof.

I claim:

1. A laser welding machine, comprising a console having an apertured flat-top work section embodying thereunder a laser power supply having an integrally formed cylindrical laser generator head vertically projecting therefrom and through the aperture of said flat-top work section to the exterior thereof and bending 90 degrees toward the flat-top work section to extend in parallel relation thereto, a laser generator provided in said laser generator head, a welding head formed in the terminal relation of said laser generator head which being further provided with an adjustable means to permit axial rotation of said laser generator head with respect to said flat-top work section for positioning said welding head in welding respect to a workpiece to be welded thereby, said laser generator head having at the terminal portion thereof a peripherally reduced section to accommodate said welding head comprising an optical system having at the terminal end thereof a conical lens mount provided with means adapted to position said lens mount on said workpiece during welding, a laser-triggering means being in electrical connection with the circuit of said laser generator and mechanically connected to said conical lens mount to be actuated thereby upon contact of said lens mount with said workpiece; a temperature-controlled cooling system disposed adjacent said power supply within said console and connected to said laser generator head through means to communicate thereinto a cooling medium for maintaining a uniform temperature therein; and, a variable-color temperature indicator secured on said console and electrically connected to a temperature sensor located in said laser generator head for monitoring the temperature therein.

2. A laser welding machine, comprising a console having a flat-top work area and containing therein a laser power supply provided at one end with a cylindrical projection extending therefrom through said flat-top work area to the exterior thereof and inclined horizontally and in parallel relation to said work area, said projection having its forward portion bent at right angles to said projection to extend vertically downward, a laser generator head disposed in said cylindrical projection and forming a part thereof, the vertically extending forward portion of said projecting having a peripherally reduced section at the terminal end thereof, a laser triggering switch secured to said forward portion adjacent said reduced section; and optical system with a conical terminal section, having a split-tip welding point at its apex and a lens at the base thereof to receive laser radiation from said laser generator, being accommodated over said reduced section and mechanically connected to said switch, and pedal means connected to said conical terminal section to produce reciprocative motion thereof upon depressing and releasing said pedal means and to close said switch during depression of said pedal means; a closed-circuit laser cooling system disposed within said console and having means for communicating with said laser generator head including a temperature-sensing means therein, a temperature indicator disposed on said console and electrically connected to said temperature-sensing means to monitor the temperature of said laser-generator head, and means located in the circuit of said laser triggering switch to open the circuit thereof upon occurrence of excessive temperature conditions within said laser generator head.

3. A laser welding machine, comprising a console having a flat-top work section embodying thereunder a laser power supply provided with an integrally formed cylindrical laser generator head projecting therefrom through said flat-top work section and being disposed in parallel relation to the surface of said flat-top, said laser generator head having a laser generator therein and a peripherally reduced section at the terminal portion thereof accommodating an optical system having a cone with a lens at its base and a split tip at its apex spaced a distance equal to the focal length of said lens from its focal plane, a radiation-propagating conduit means disposed between said laser generator and said cone to transmit laser radiation from said laser generator to said lens in said cone, means in mechanical relation to said optical system for triggering said laser generator to bursts of laser radiation and an interval timer in the circuit of said means to time the interval between said laser bursts, a temperature-controlled platen secured to said flat-top work section adjacent to the split tip of said cone for adjustably holding a workpiece under said cone, a liquid reservoir disposed in said console and positioned in the inferior relation to said flat-top work section and having means communicating with said laser generator head to circulate said liquid through said laser generator for cooling said generator, said console having thereon a temperature indicator with a thermal sensor located in said laser generator for monitoring the temperature thereof, and means in the circuit of said thermal sensor connected to the circuit of said laser generator to stop laser action when excessive temperature conditions occur in said laser generator.

4. A laser welding machine, comprising a console having a flat-top work section supporting thereunder a laser power supply provided with an integrally formed cylindrical laser-generator head projecting therefrom through said flat-top section and disposed in parallel respect to said flat-top, said laser-generator head having a laser-generator therein and at its terminal portion a peripherally reduced section accommodating an optical system having a split-tip cone and negotiating with means adjacent thereto and connected to said power supply for triggering said laser-generator to emission of radiation, a temperature-adjustable platen disposed on said flat-top adjacent to said split-tip cone for adjustably holding a welding workpiece thereunder, and an interval timer in the circuit of said power supply to time the interval between laser bursts of said laser-generator, said console having therein a closed-circuit cooling system connected to said laser-generator head and circulating a fluid therethrough to maintain a uniform temperature therein, and a temperature indicator mounted on said console and connected to said laser-generator head to monitor the temperature therein.

5. In a laser welding machine, as claimed in claim 4, wherein said optical system comprising a bundle of fiber optics enclosed in a flexible conduit extending from said laser-generator head and terminating in an optical cone having a lens at its base section and a split tip at its apex separated from said lens by a distance equal to the focal length of said lens, an electric cable from the circuit of said power supply extending along said flexible conduit and carried thereby to adjacence of said optical cone and terminating in series-connected microswitches for triggering the laser generator to emission of laser radiation upon simultaneously depressing said microswitches to close the laser triggering circuit in said power supply.

6. A laser welding machine, comprising a flat-top console embodying a laser power supply therein and a laser-generator head having a laser generator therein and at a terminal portion thereof an optical system provided with a split-tip laser welding head, a radiation propagating conduit disposed between said laser-generator head and said split-tip laser welding head to transmit laser beam from said laser generator to said split-tip laser welding head, means adjacent to and negotiating with said optical system for triggering said laser generator to bursts of laser radiation and a timer in the circuit of said power supply to control the interval between said laser bursts, a cooling means in said console and connected through conduits to said laser-generator head to circulate fluid therethrough and cool said laser generator, and a temperature indicator located on the lateral aspect of said console and having means communicating with said laser-generator head to monitor the temperature therein.

7. A laser welding machine, comprising a console cabinet having a flat-top work section supporting thereunder a laser power supply provided with a cylindrical projection extending through said flat top section to the exterior thereof and inclined horizontally with respect to said flat top, said cylindrical projection having a laser generator therein and adjacent to its terminal portion a peripherally reduced section, an optical system embodying a radiation transmitting conduit, one end of which having a cylindrical collar adapted to be accommodated thereby on said peripherally reduced section and the other end terminating in an optical cone having a lens at its base section and a split tip at its apex, forming a welding head therewith, means from said power supply and disposed adjacent to said optical cone to trigger said laser generator upon contact of said split tip with a workpiece being welded thereunder, and a cooling system in said console cabinet communicating through said cylindrical projection with said laser generator to maintain therein a uniform temperature, and a temperature monitoring means in the circuit of said laser triggering means to monitor said temperature and render said triggering means inoperative when excessive temperature conditions occur in said laser generator.

8. A laser welding machine, comprising a console having a flat-top work section embodying thereunder a laser power supply provided with an integrally formed cylindrical projection protruding through the flat top to the exterior thereof and forming a right-angle extension therefrom parallel to said flat-top work section, said extension having a laser generator disposed therein and forming a part thereof being provided adjacent to its terminal portion with a laser triggering switch and forward thereto a peripherally reduced section slidably accommodating a conical optical system having a lens at its base section and a split-tip welding point at its apex, means secured to said optical system for actuating said switch, a reciprocative pedal means connected to said switch actuating means and adapted to produce a reciprocative motion of said conical optical system on said reduced section upon pedally depressing and releasing said pedal means, thereby closing said laser triggering switch upon displacement of said optical system to a point remotest from said laser generator.

9. A laser welding machine, comprising a console cabinet having a flat-top work section supporting thereunder a laser power supply having a cylindrical section protruding through said flat top section and projecting in parallel relation thereto, said cylindrical section having a laser generator therein and terminating in a peripherally reduced portion thereof slidably accommodating a conical optical system having means adapted to impart an axial motion to said optical system on said reduced portion, a treadle provided in said console cabinet and having means to negotiate with said means of said conical optical system to actuate said optical system to and from a welding workpiece placed thereunder, means in the laser generator circuit of said power supply associated with said treadle to trigger said laser generator upon displacement of said optical system to the workpiece, and a thermostatically controlled refrigerative cooling system disposed in said console and communicating, through conduits disposed in said cylindrical section, with said laser generator to maintain a uniform temperature therein, a temperature indicator connected in the circuit of said laser triggering means and having a relay to open said circuit upon occurrence of an excessive temperature in said laser generator, said laser triggering circuit having a pulse interval timer actuated by said laser triggering means to control the interval between laser pulse emissions from said laser generator.

10. A laser welding machine, comprising a console cabinet incorporating therein a laser power supply and having a flat top provided with a cylindrical projection supported thereon and bending at right angles to extend in parallel relation thereto, a laser generator disposed in the parallel section of said cylindrical projection which being provided with a peripherally reduced section formed in the terminal end thereof, an optical system having at one end an optical cone with a lens at its base section and a split tip at its apex separated from said lens at a distance equal to the focal length of said lens and at the other end having a collar adapted to be slidably accommodated on said peripherally reduced section and to execute reciprocative movement thereon during welding, a thermally controlled, directionally adjustable platen secured to said flat top adjacent to said cone for holding a welding workpiece under said cone, said console cabinet having hydraulically operated treadle connected through a flexible conduit to said optical cone for movement thereof to and from said workpiece placed thereunder and making a contact therewith by means of said split tip during interval of welding operation, an electric switch associated with means secured to said treadle and connected to the circuit of said power supply for triggering said laser generator upon contact of said split tip with the welding workpiece, and a temperature-controlled cooling system located in said console with conduits connected to said laser generator and circulating cooling fluid therethrough to maintain a uniform temperature in said laser generator, which including a temperature sensing means having a relay and connected in the circuit of said laser generator to monitor said temperature therein and to open said relay upon occurrence of excessive temperature conditions in said laser generator.

11. A laser welding machine, comprising a console cabinet incorporating therein a laser power supply and having a flat-top work area provided with a cylindrical projection including a laser generator protruding therethrough and bending at right angles to extend in parallel relation to said flat top and terminating at a peripherally reduced section formed in the terminal end thereof, an optical system having at one end an optical cone with a lens at its base section and a split tip at its apex distanced from said lens an axial length equal to the focal length of said lens and at the other end being provided with a collar adapted to be slidably accommodated on said peripherally reduced section to form a laser welding head, means disposed between said laser generator and said optical cone for transmitting the laser beam from said generator to said optical cone, a second means disposed adjacent to and negotiating with said optical system and electrically connected to the circuit of said power supply for triggering said laser generator to bursts of laser radiation and a timer disposed in the circuit of said power supply to control the interval between said laser bursts, a cryogenic cooling system embodied in said console cabinet and coupled to said laser generator to circulate fluid therethrough, and a temperature indicator located on the instrument panel of said console cabinet and in communication with said laser generator to monitor the temperature thereof, said temperature indicator being provided with an electric relay connected in the circuit of said laser generator to open the circuit thereof upon occurrence of excessive temperature conditions in said laser generator.

12. In a laser welding machine, the combination of claim 7 which said rediation transmitting conduit comprising a bundle of fiber optics extending from said cylindrical collar to the adjacent of said optical cone, and a leasing rod disposed between said optical cone and the terminal end of said fiber optics bundle for amplifying the laser radiation transmitted through said bundle of fiber optics to said optical cone.

13. A laser welding machine as defined in claim 7, wherein said radiation transmitting conduit being a fiber optics bundle provided with a sheath along the entire length thereof, and wherein said means from said power supply and disposed adjacent to said optical cone to trigger said laser generator comprising an electric cable connected in a circuit of said laser generator and running along the length of said fiber optics and attached to said sheath and terminating in a plurality of series-connected switches.

14. A laser welding machine as defined in claim 7, wherein said optical system embodying a radiation transmitting conduit having at one end thereof a cylindrical collar and at the other end terminating in a split-tip conical lens mount having a plurality of lenses therein and adapted with means to adjustably space said lenses one from the other to focus the radiation from said conduit on a workpiece placed under said split-tip monical lens mount.

References Cited
UNITED STATES PATENTS

| | | | |
|---|---|---|---|
| 3,096,767 | 7/1963 | Gresser et al. | 219—121 |
| 3,259,730 | 7/1966 | Wehde et al. | 219—121 |
| 3,268,855 | 8/1966 | Norton | 219—121 |
| 3,293,652 | 12/1966 | Roshon et al. | 219—69 |

RICHARD M. WOOD, *Primary Examiner.*

W. D. BROOKS, *Assistant Examiner.*